(12) United States Patent
Ishikawa et al.

(10) Patent No.: US 8,340,876 B2
(45) Date of Patent: Dec. 25, 2012

(54) CONTROLLER FOR AUTOMATIC TRANSMISSION

(75) Inventors: Osamu Ishikawa, Chiyoda-ku (JP); Takeru Okabe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 548 days.

(21) Appl. No.: 12/644,801

(22) Filed: Dec. 22, 2009

(65) Prior Publication Data

US 2010/0241324 A1   Sep. 23, 2010

(30) Foreign Application Priority Data

Mar. 18, 2009   (JP) ................................. 2009-066295

(51) Int. Cl.
*F16H 63/00* (2006.01)

(52) U.S. Cl. ............ 701/51; 701/61; 180/170; 180/197; 180/6.2; 180/410; 475/49; 475/331

(58) Field of Classification Search .................... 701/51, 701/61, 55; 180/170, 197, 6.2, 410; 475/49, 475/331

See application file for complete search history.

(56) References Cited

U.S. PATENT DOCUMENTS

| | | | | |
|---|---|---|---|---|
| 6,042,506 A * | 3/2000 | Kozaki et al. | ................. | 477/148 |
| 6,276,131 B1 * | 8/2001 | Ueno et al. | ...................... | 60/285 |
| 6,415,215 B1 * | 7/2002 | Nishizaki et al. | ................ | 701/70 |
| 6,514,166 B2 * | 2/2003 | Yuasa et al. | .................... | 475/125 |
| 6,817,339 B2 * | 11/2004 | Hirakata et al. | .............. | 123/399 |
| 7,135,831 B2 * | 11/2006 | Akiyama | ....................... | 318/601 |
| 7,313,980 B2 * | 1/2008 | Otsuka et al. | ................... | 74/335 |
| 7,912,614 B2 * | 3/2011 | Honma et al. | ................... | 701/51 |
| 8,073,593 B2 * | 12/2011 | Mikamo et al. | ................ | 701/41 |
| 8,226,507 B2 * | 7/2012 | Uchiyama | ........................ | 474/49 |
| 2005/0228564 A1 * | 10/2005 | Kato et al. | ....................... | 701/41 |
| 2005/0273235 A1 * | 12/2005 | Ohta et al. | ....................... | 701/41 |

FOREIGN PATENT DOCUMENTS

JP   2001-004023 A   1/2001

* cited by examiner

*Primary Examiner* — Tuan C. To (74) *Attorney, Agent, or Firm* — Sughrue Mion, PLLC (57) ABSTRACT

In an automatic transmission controller, a gear shift control unit has a target rotational angle position calculator for calculating a target rotational angle position of a gear shift motor, an actual rotational angle position calculator for calculating the actual rotational angle position of the gear shift motor, and an F/B gain setting unit. When a gear shift instruction from a gear shift controller is a gear shift pattern for driving at least a select motor, the F/B gain is set to be larger that of the gear shift pattern in which the select motor is not driven, and also a motor driving mode and a motor braking mode are switched to each other in accordance with the difference between the target rotational angle position and the actual rotational angle position.

9 Claims, 8 Drawing Sheets

CONTROLLER FOR AUTOMATIC TRANSMISSION

BACKGROUND OF THE INVENTION

1. Field of the Invention

The present invention relates to a controller for an automatic transmission which is mounted in a vehicle and controls gear shift by a motor.

2. Description of the Related Art

As this type of controller has been hitherto known a controller for a transmission shift operation device that is equipped with an electric motor for rotating the shift shaft of a transmission, performs F/B control on the basis of the difference between a target operation position calculated in a motor driving control circuit and an actual operation position to control the driving current of the electric motor, and drives the electric motor in a forward rotation or a reverse direction to enable a transmission shift operation (for example, see JP-A-2001-4023).

According to the related technique as described above, when the shift shaft of the transmission reaches the target operation position, the driving current to the electric motor is stopped, both the terminals of the armature of the electric motor are short-circuited to each other for a constant time to brake suddenly and stop the shift shaft at the target operation position, and then the short-circuiting concerned is released.

However, in the automatic transmission having the electric motor as described above, when the difference between the target operation position and the actual operation position is calculated and the F/B control (PID control) is performed on the basis of this difference, the driving current of the motor is controlled so that the shift shaft of the transmission is made to reach the target operation position as early as possible by increasing the F/B control gain. In this case, however, even when the actual operation position reaches the target operation position, both the terminals of the armature are short-circuited to each other to brake suddenly so that the shift shaft of the transmission can be stopped at the target operation position, the F/B gain is large and the driving force of the motor is increased. Consequently, the braking force for the sudden braking is insufficient, the shift shaft passes over the target operation position due to the inertia of the motor and thus gear shift time is lengthened.

Furthermore, when the shift shaft of the transmission reaches the target operation position, it is certainly necessary to short-circuit both the terminals of the armature for braking, and thus there is a problem that the short-circuit current occurs every gear shift and thus circuit elements and the electric motor are heated and deteriorated.

SUMMARY OF THE INVENTION

Therefore, the present invention has been implemented in view of the foregoing problems, and has an object to provide a controller for an automatic transmission that increases an F/B control gain only in the case of a specific gear shift pattern and a motor is braked at a proper timing in accordance with the difference between an actual operation position and a target operation position, whereby the gear shift time can be shortened and the motor and circuit elements can be also prevented from being excessively heated and deteriorated by short-circuit current at the braking time of the motor.

According to a first aspect of the present invention, a controller for an automatic transmission includes: a clutch mechanism interposed between an engine and a gear shift mechanism to transmit driving power from the engine to the gear shift mechanism; a shift motor and a select motor for executing a gear shift operation of the gear shift mechanism; a gear shift control unit for controlling the shift motor and the select motor; and a gear shift control unit for instructing a gear shift pattern corresponding to a driving state to the gear shift control unit, wherein the gear shift control unit has a target rotational angle position calculator for calculating a target rotational angle position of the shift motor and the select motor, an actual rotational angle position calculator for calculating an actual rotational angle position of the shift motor and the select motor, and an F/B gain setting unit for setting an F/B gain in accordance with a gear shift pattern, and when a gear shift instruction from the gear shift control unit is a gear shift pattern for driving at least the select motor, the F/B gain is set to be larger than a gear shift pattern which does not drive the select motor, and also a motor driving mode and a motor braking mode are switched to each other in accordance with the difference between the target rotational angle position and the actual rotational angle position.

According to a second aspect of the present invention, a controller for an automatic transmission includes: a clutch mechanism interposed between an engine and a gear shift mechanism to transmit driving power from the engine to the gear shift mechanism; a shift motor and a select motor for executing a gear shift operation of the gear shift mechanism; a gear shift control unit for controlling the shift motor and the select motor; and a gear shift control unit for instructing a gear shift pattern corresponding to a driving state to the gear shift control unit, wherein the gear shift control unit has a target rotational angle position calculator for calculating a target rotational angle position of the shift motor and the select motor, an actual rotational angle position calculator for calculating an actual rotational angle position of the shift motor and the select motor, and an F/B gain setting unit for setting an F/B gain in accordance with a gear shift pattern, and wherein upon an instruction of shift-down at the time of kick-down, the F/B gain is set to a first F/B gain by the F/B gain setting unit, a motor driving mode of subjecting the output of the motor to F/B control in accordance with the difference between the target motor rotational angle position and the actual motor rotational angle position and the first F/B gain and drive the shift motor and the select motor is set when the difference between the target motor rotational angle position and the actual motor rotational angle position is out of a predetermined area, and a motor braking mode of short-circuiting an armature winding of the motor to brake the shift motor and the select motor when the difference between the target motor rotational angle position and the actual motor rotational angle position is within the predetermined area; and upon an instruction of gear shift other than shift-down at the time of kick-down, the F/B gain is set to a second F/B gain by the F/B gain setting unit, and a motor driving mode for subjecting the output of the motor to F/B control in accordance with the difference between the target motor rotational angle position and the actual motor rotational angle position and the second F/B gain and driving the shift motor and the select motor is set.

When the gear-shift instruction from the gear-shift control unit is a gear shift pattern for driving at least the select motor, the F/B gain is set to be larger in gain than a gear shift pattern which does not drive the select motor, and also the motor driving motor and the motor braking mode are switched to each other in accordance with the difference between the target rotational angle position and the actual rotational angle position, whereby the gear shift time can be shortened while the actual gear shift motor rotational angle position is prevented from exceeding the target gear shift motor rotational angle position.

In the case of such a gear shift pattern that downshift is executed by kick-down, in the motor driving mode, the F/B control gain is set to a large value so that the rotational angle position of the shift motor and the select motor (hereinafter referred to as "gear shift motor") quickly reaches the target rotational angle position, and only when the difference between the target rotational angle position of the gear shift motor and the actual rotational angle position of the gear shift motor is within a predetermined area, the motor braking mode is set. In this case, the motor is short-circuited to brake the gear shift motor at a proper timing, whereby the gear shift time at the kick-down time can be shortened while the actual rotational angle position of the gear shift motor does not pass over the target rotational angle position of the gear shift motor, and additionally the motor braking mode is used at the time of the downshift caused by the kick-down. Therefore, even when a motor driving elements and a motor coil are heated by short-circuit current occurring at the braking time of the motor, the heat is radiated for a long time under a gear shift pattern using no motor braking mode such as normal shift-up, down-shift or the like, so that thermal deterioration of the motor driving elements and the motor coil can be further suppressed.

The foregoing and other object, features, aspects, and advantages of the present invention will become more apparent from the following detailed description of the present invention when taken in conjunction with the accompanying drawings.

DETAILED DESCRIPTION OF THE EMBODIMENTS

Embodiments according to the present invention will be described hereunder with reference to the accompanying drawings.

First Embodiment

A first embodiment according to the present invention will be described with reference to FIGS. 1 to 6.

Figure 1:
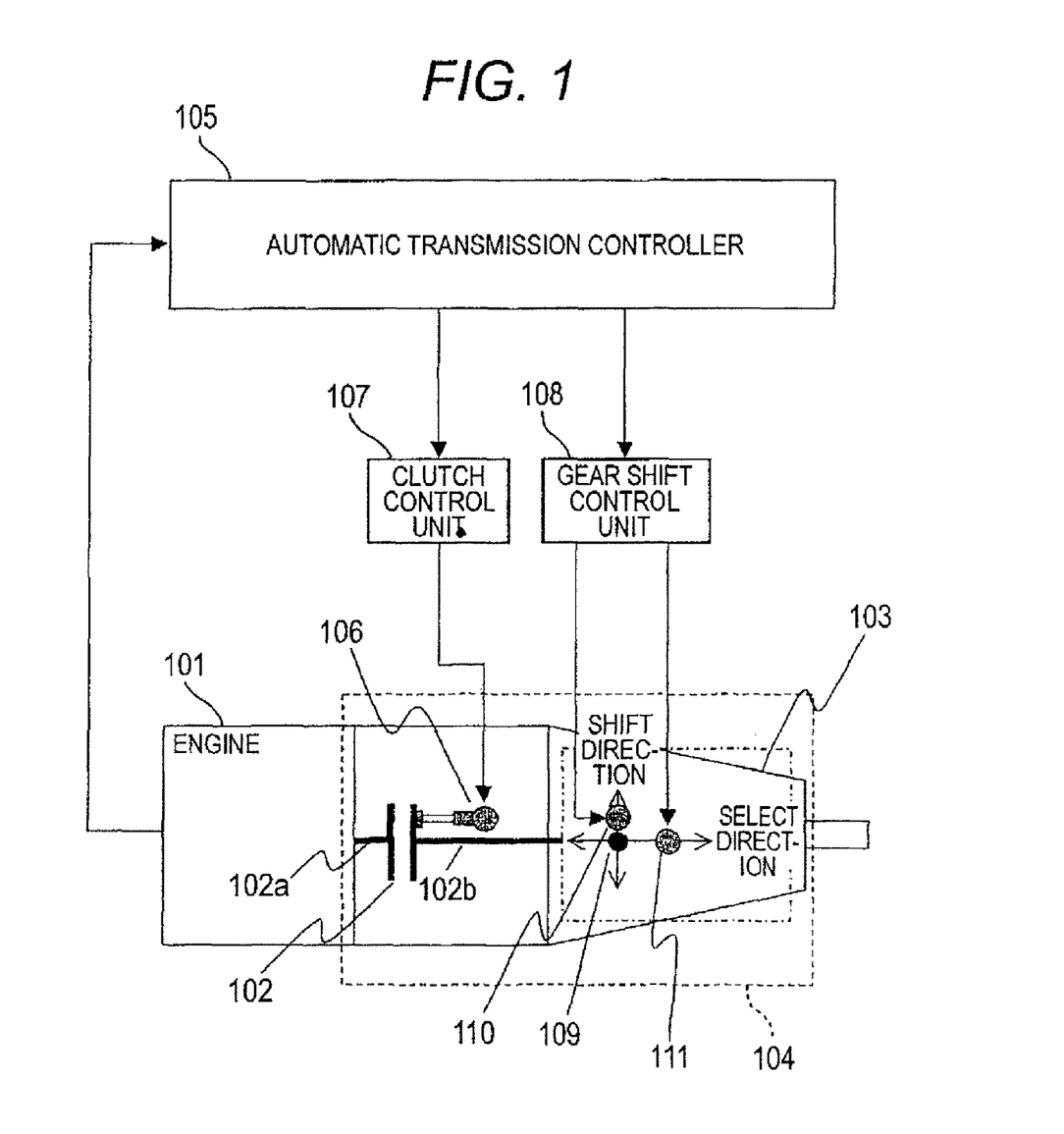
FIG. 1 is a diagram showing a system construction of a controller for a transmission according to first and second embodiments of the present invention.

FIG. 1 is a diagram showing the system construction of a controller for a transmission according to the present invention. In FIG. 1, the output shaft 102a of an engine 101 is directly coupled to a clutch mechanism 102 having a friction clutch, and the clutch mechanism 102 is directly coupled to the input shaft 102b of an automatic shift gear mechanism 103 for changing a gear shift stage of an automatic transmission 104. The engagement and release of the clutch mechanism 102 can be performed by driving the clutch motor 106.

When the clutch mechanism 102 is engaged, the engine power is transmitted from an engine 101 to the automatic gear shift mechanism 103, and when the clutch mechanism 102 is released, no engine power is transmitted from the engine 101 to the automatic gear shift mechanism 103. An automatic transmission controller 105 determines the necessity of release/engagement of the clutch and switching of the gear shift stage on the basis of information on a running state of a vehicle such as a vehicle speed, an engine load, etc., and generates a signal for executing release of clutch—change of shift gear—engagement of clutch.

A clutch control unit 107 performs clutch control on the basis of an instruction of the automatic transmission controller 105 so that the rotational angle of the clutch motor 106 is proportional to the stroke amount in the engagement and release direction of the clutch mechanism.

When a clutch engaging instruction is provided from the automatic transmission controller 105, the clutch motor makes a stroke in the clutch engaging direction to engage the clutch. When a clutch releasing instruction is provided from the automatic transmission controller 105, the clutch motor makes a stroke in the clutch releasing direction to release the clutch.

A gear shift control unit 108 controls the gear shift stage of the automatic gear shift mechanism 103 on the basis of an instruction from the automatic transmission controller 105. The automatic transmission 104 is operated by the automatic gear shift mechanism 103 to shift the gear. The automatic gear shift mechanism 103 has a select motor 111 for moving a shift lever 109 in a select direction, and a shift motor 110 for moving the shift lever 109 in a shift direction (both the electric motors are not discriminated from each other and hereinafter referred to as gear shift motor). The rotational angle of the gear shift motor is proportional to the stroke amount of the shift lever 109. When the gear shift operation is carried out, the rotational angle position of the gear shift motor is controlled by the gear shift control unit 108 to move the shift lever 109 so that the engagement state of a gear mechanism of the automatic transmission is switched to a required state corresponding to a gear shift stage, thereby changing the gear shift stage.

Figure 2:
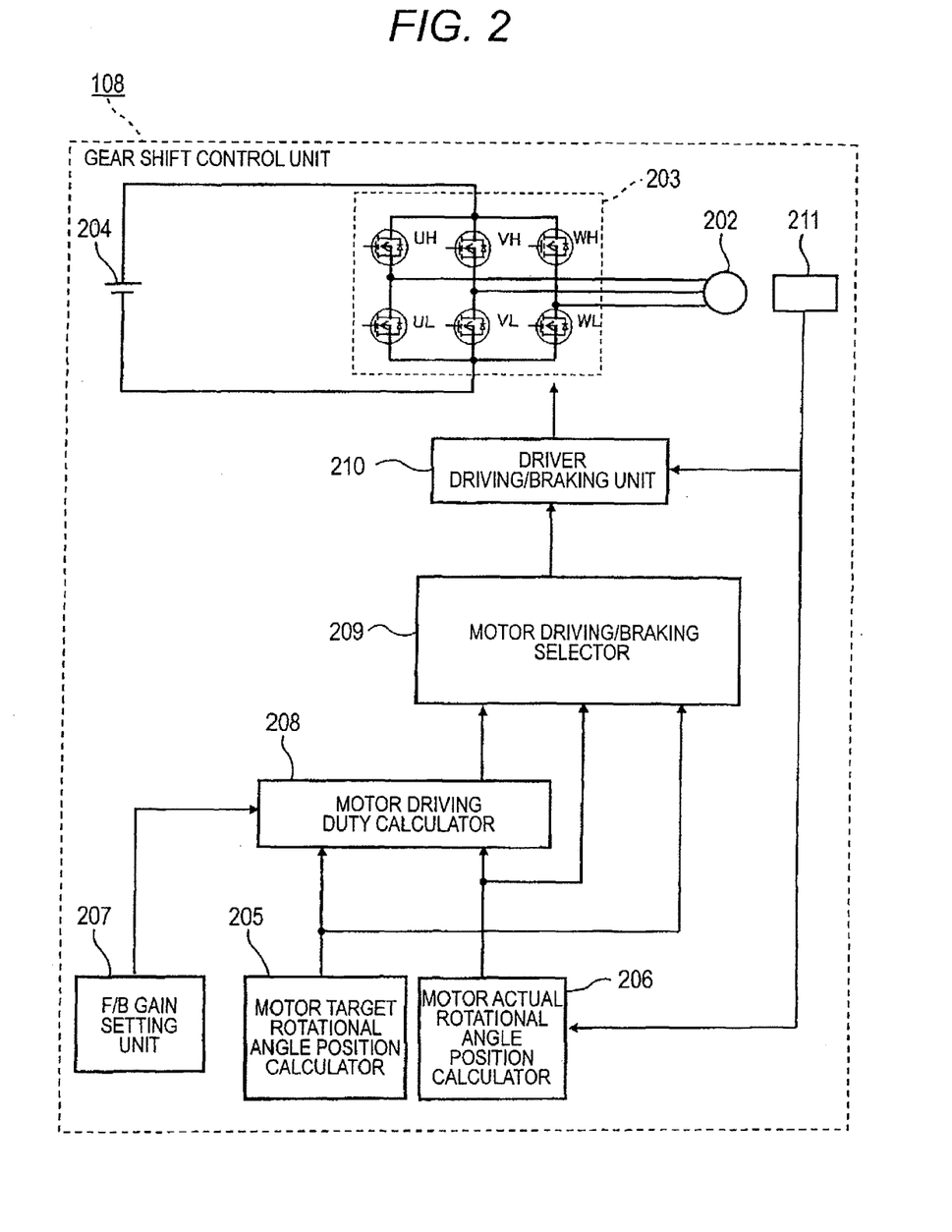
FIG. 2 is a diagram showing a system construction of a gear shift motor control unit according to the first and second embodiments of the present invention.

FIG. 2 is a diagram showing the detailed construction of the gear shift control unit 108.

In FIG. 2, 202 represents a gear shift motor for driving the shift lever, and a three-phase brushless motor is illustrated as an example. 211 represents a motor rotational position detecting sensor for detecting the rotational position of the gear shift motor.

203 represents a motor driving circuit, and it is an inverter comprising six FETs of UH, UL, VH, VL, WH, WL. 204 represents a DC power supply of a motor driving circuit. 205 represents a motor target rotational angle position calculator for calculating a target motor rotational angle position in response to an instruction signal from the automatic transmission controller 105, and 206 represents a motor actual angle position calculator for calculating the actual rotational angle position of the motor on the basis of the motor rotational position detected by the motor rotational position detecting sensor 211.

207 represents an F/B gain setting unit for setting an F/B gain in accordance with a gear shift pattern instructed from the automatic transmission controller 105.

208 represents a motor driving DUTY calculator for calculating driving DUTY to be supplied to the motor driving circuit 203 in accordance with the product between the F/B gain and the difference (deviation) between the motor target rotational angle position and the motor actual rotational angle position. The driving DUTY (motor current amount) is adjusted by performing the feedback control based on the difference between the motor actual rotational angle position and the motor target rotational angle position.

209 represents a motor driving/braking selecting unit for selecting one of a driving mode and a braking mode to be set to the gear shift motor in accordance with the gear shift pattern instructed from the automatic transmission controller and the difference between the motor target rotational angle position and the motor actual rotational angle position.

210 represents a driver driving/braking unit. When the motor driving mode is selected by the motor driving/braking selecting unit 209, the driver driving/braking unit 210 selects to be operated in accordance with the motor position detected by the motor rotational position detecting sensor 211, and drives the motor driving circuit 203 in accordance with the driving DUTY calculated by the motor driving DUTY calculator 208 for the FET concerned. When the motor braking mode is selected, the driver driving/braking unit 210 short-circuits the gear shift motor 202 to brake the gear shift motor.

Figure 3:
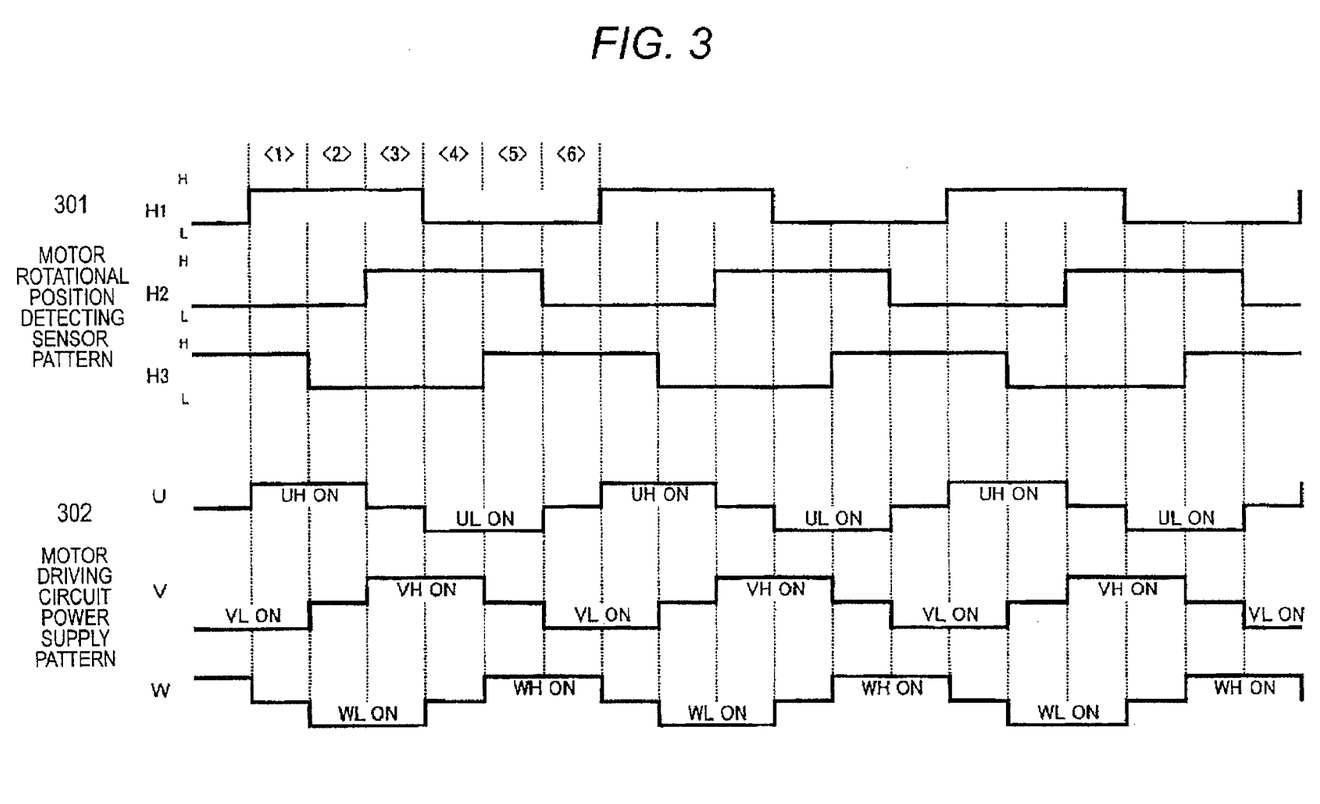
FIG. 3 is a diagram showing the relationship between an output pattern of a motor rotational position detecting sensor and a power supply pattern of a motor driving circuit according to the first and second embodiments of the present invention.

FIG. 3 is a diagram showing a driving pattern of the motor driving circuit when the motor is rotated in one direction on the basis of the position information detected by the motor rotational position detecting sensor 211 in the motor driving mode. 301 represents an output pattern of the motor rotational position detecting sensor 211, and in this case, FIG. 3 shows output patterns of sensors H1, H2 and H3 when a three-phase brushless motor is supplied with power and driven by 120° C. The output of each sensor is set to high level (H) or low level (L), and six patterns are repetitively output in the order of (1) to (6) in accordance with the motor rotational angle. 302 represents a power supply pattern of the motor driving circuit 203 with respect to the output pattern of the motor rotational position detecting sensor 211, and shows a driving state of FET of each phase.

For example, in the case of (1), UH and VL of the motor driving circuit are set to ON when the output pattern of the motor position detecting sensor 211 is (H1, H2, H3)=(H, L, H). In the case of (2), UH and WL are set to ON when the output pattern of the motor rotational position detecting sensor is (H1, H2, H3)=(H, L, L).

As described above, the power supply pattern of FETs of the motor driving circuit is switched with respect to the output pattern of the motor rotational position detecting sensor, and thus driving force occurs in the motor, whereby the shift lever can be moved.

Furthermore, in the motor braking mode, UH, VH and WH of the motor driving circuit are set to OFF during the motor braking mode and UL, VL and WL thereof are set to ON during the motor braking mode, whereby the motor is short-circuited and the braking force is generated in the motor, so that the movement of the shift lever can be suppressed.

Figure 4:
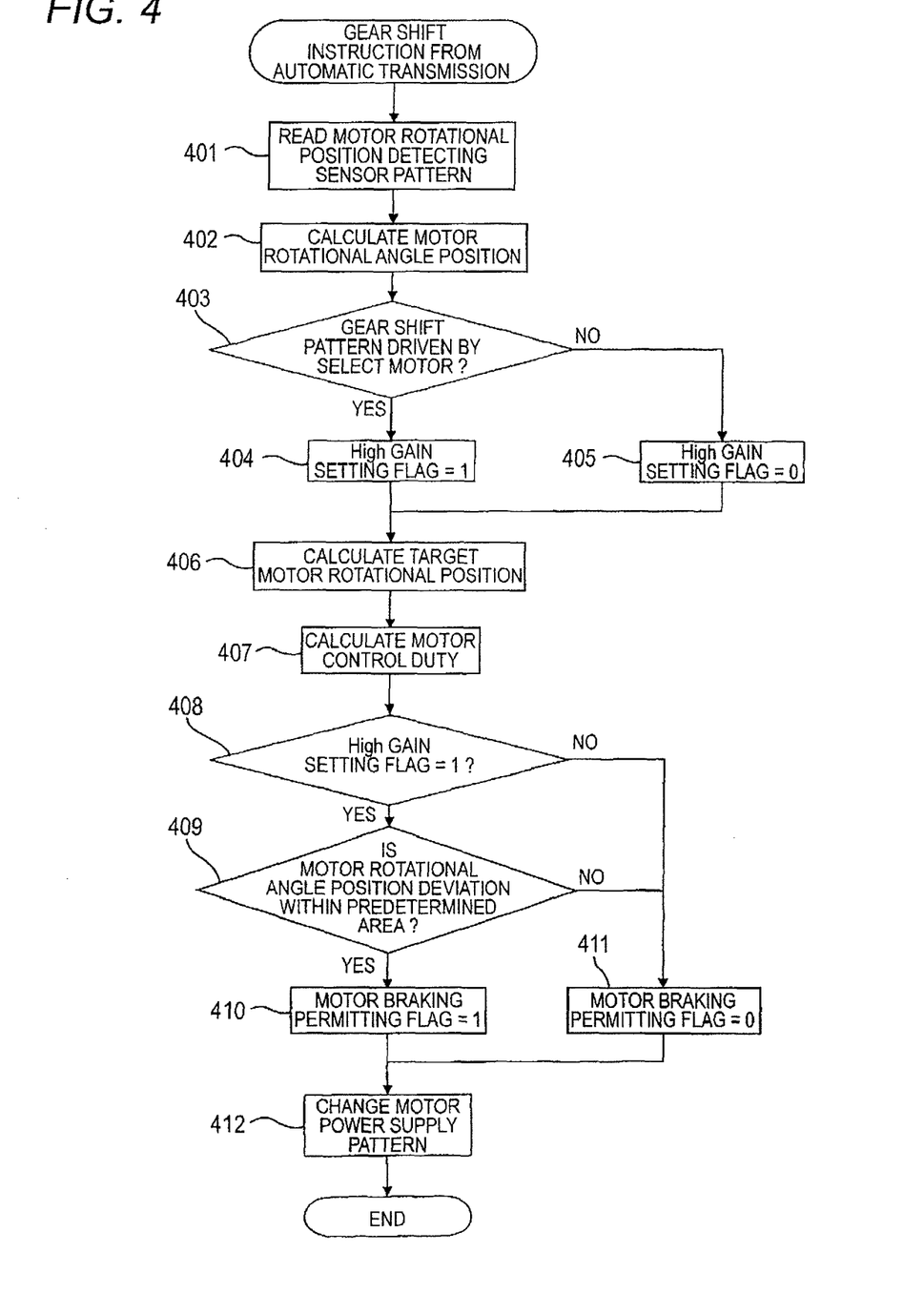
FIG. 4 is a flowchart showing a control method for the gear shift motor according to the first embodiment.

FIG. 4 is a flowchart showing a method of controlling the gear shift motor 202, and this processing is executed when a gear shift instruction is output from the automatic transmission controller 105.

In step 401, a pattern of the motor rotational position detecting sensor is read in. Step 402 is a step for calculating the motor rotational angle position. In this step, the actual motor rotational angle position is calculated on the basis of the pattern of the motor rotational position detecting sensor which is read in step 401, and then the processing goes to step 403. IN step 403, it is determined whether the gear shift instruction from the automatic transmission controller is a gear shift instruction for driving the select motor or not.

Figure 5A:
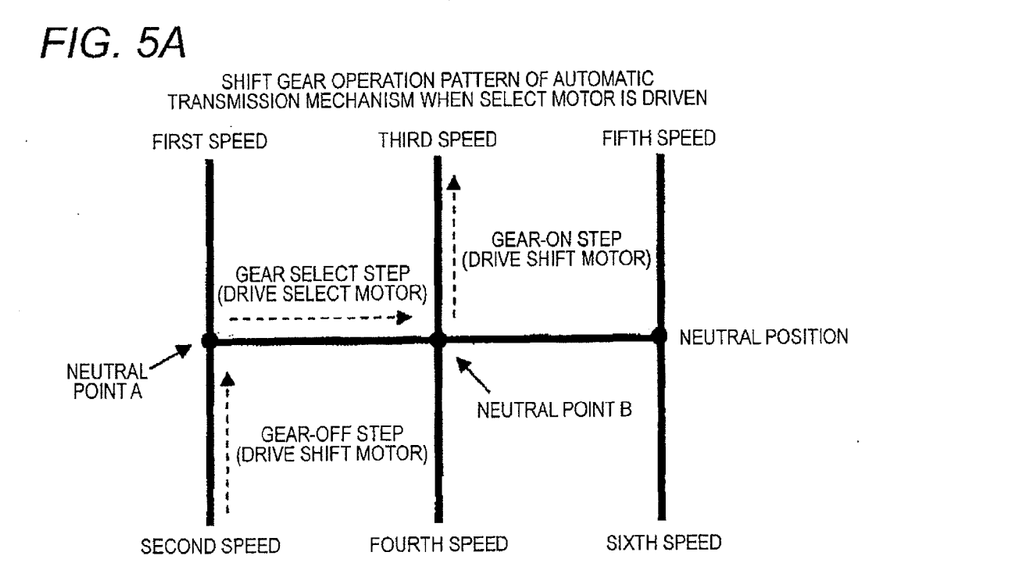
FIG. 5A is a diagram showing a gear shift operation pattern of an automatic gear shift mechanism when a select motor is driven in the first and second embodiments of the present invention.

For example, when a gear-shift instruction of shifting from the second gear to the third gear is provided from the automatic transmission controller, a gear shift operation as shown in FIG. 5A is executed. That is, the shift motor is driven from the second gear to move the shift lever to a neutral point A (gear-off step). Subsequently, the select motor is driven from the neutral point A to move the shift lever to a neutral point B (gear selection step). Finally, the shift motor is driven from the neutral point B to move the shift lever to the third gear (gear-on step). Accordingly, the gear shift operation is completed with passing through the three stages from the gear shift instruction. Accordingly (the gear shift pattern for driving the select motor), it is apparent that the select motor is certainly driven in the up-shift/downshift between the second gear and the third gear and in the up-shift/downshift between the fourth gear and the fifth gear.

Figure 5B:
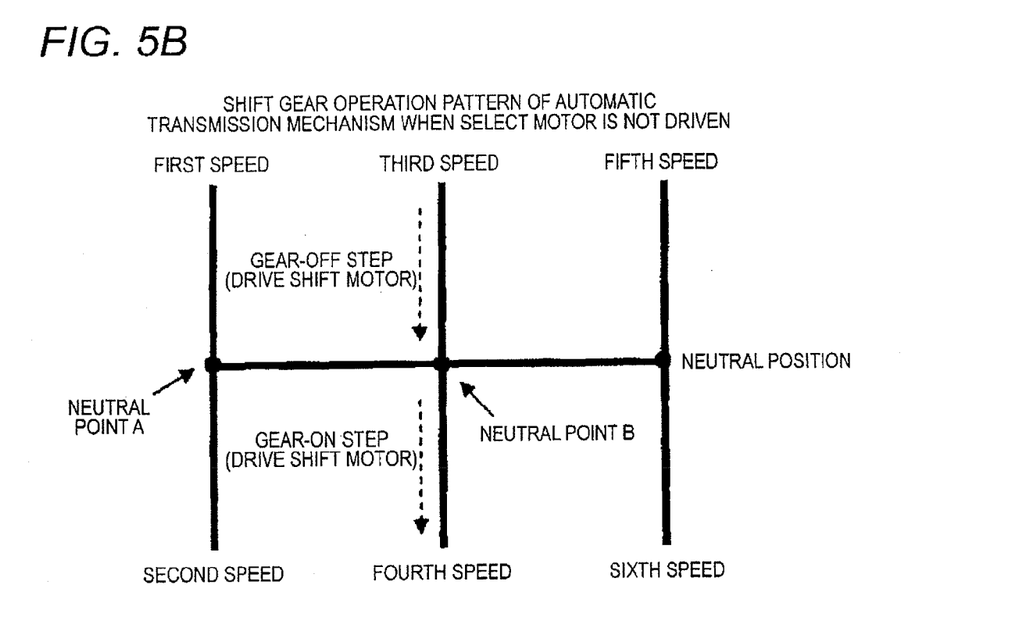
FIG. 5B is a diagram showing a gear shift operation pattern of the automatic gear shift mechanism when the select motor is not driven in the first and second embodiments of the present invention.

Furthermore, for example when a gear shift instruction of shifting from the third gear to the fourth gear is provided from the automatic transmission controller, the gear shift operation is executed so that the shift motor is driven from the third gear state to move the shift lever through the neutral point B to the fourth gear as shown in FIG. 5B. Accordingly, the gear shift operation is completed with passing through only one stage from the gear shift instruction by using only the shift motor. Accordingly (the gear shift pattern in which the select motor is not driven), it is apparent that the select motor is not driven, but only the shift motor is driven in the up-shift/downshift between the first gear and the second gear, in the up-shift/downshift between the third gear and the fourth gear and in the up-shift/downshift between the fifth gear and the sixth gear.

Accordingly, the gear change time when the gear shift instruction from the automatic transmission controller indicates the gear shift pattern in which the select motor is driven (the gear shift pattern in which the gear shift operation passes through the three stages from the gear shift instruction of FIG. 5A and then is completed) is longer than the gear shift pattern in which the select motor is not driven (the gear shift pattern in which the gear shift operation passes through one stage from the gear shift instruction of FIG. 5B and then is completed) because the number of gear shift stages is larger.

When the gear shift instruction from the automatic transmission controller indicates such a gear shift pattern that the select motor is not driven, the operation goes to step 405 to set an F/B gain described later as a preset second F/B gain and set a High gain setting flag to zero.

When the gear shift instruction from the automatic transmission controller indicates such a gear shift pattern that the select motor is driven, the operation goes to step 404 to sets a position F/B gain described later as a first F/B gain larger than the second F/B gain and set the High gain setting flag to 1.

A target shift motor rotational angle position and a target select motor rotational angle position for setting a proper motor rotational angle position corresponding to a gear shift instruction from the automatic transmission controller are calculated in step 406.

In step 407, motor control DUTY is calculated on the basis of the product between the difference between the target motor rotational angle position calculated in step 406 and the actual motor rotational angle position calculated in step 402 and the F/B gain set in step 404 or step 405, and the feedback control is executed on the basis of the motor control DUTY, whereby the actual motor rotational angle position is converged to the target motor rotational angle position.

As described above, when the gear shift instruction from the automatic transmission controller indicates the gear shift pattern for driving the select motor (the gear shift pattern in which the gear shift operation passes through the three stages from the gear shift instruction and then is completed), the F/B gain is set to the first F/B gain which is larger than the second F/B gain of the gear shift pattern in which the select motor is not driven (the gear shift pattern in which the gear shift operation passes through one stage from the gear shift instruction and then is completed), whereby the time required for the actual motor rotational angle position to reach the target motor rotational angle position can be shortened in each gear shift step.

When it is determined in step 408 that the High gain setting flag is set to 1, the processing goes to step 409. On the other hand, when it is determined in step 408 that the High gain setting flag is set to 0, the processing goes to step 411 to set the motor braking permitting flag to 0. In step 409, it is determined whether the difference between the target motor rotational angle position and the actual motor rotational angle position is within a predetermined area or not. When the difference is within an area which is smaller than a motor braking start difference (deviation) α and larger than a motor braking end difference (deviation) β, the processing goes to step 410 to set the motor braking permitting flag to 1. Furthermore, when the difference is within an area which is larger than the motor braking start difference α or smaller than the motor braking end difference β, the processing goes to step 411 to reset the motor braking permitting flag to 0.

In step 412, when the motor braking permitting flag is set to 0, it indicates the motor driving mode, and thus the power supply pattern of the motor driving circuit is switched to the pattern corresponding to the motor rotational position detecting sensor which is read in step 401, whereby the motor is driven in accordance with the motor control DUTY calculated in step 407. When the motor braking flag is set to 1, it indicates the motor braking mode, and thus irrespective of the motor rotational position detecting sensor, the power supply pattern of the motor driving circuit is set so that UH, VH and WH are set to OFF while the motor braking permitting flag is set to 1 and UL, VL and WL are set to ON while the motor braking permitting flag is set to 1, whereby the motor is short-circuited and braked.

As described above, when the High gain setting flag is set to 1, the motor driving method is set to the motor driving mode until the motor rotational angle position falls into a predetermined difference area. When the motor rotational angle position difference is within the predetermined difference area, the motor driving method is changed from the motor driving mode to the motor braking mode to brake the motor. When the motor rotational angle position gets out of the predetermined difference area (just before the actual motor rotational angle position reaches the target motor rotational angle position) again, the motor driving method is returned from the motor braking mode to the motor driving mode, whereby the actual motor rotational angle position is converged to the target motor rotational angle position while the motor is braked at a proper timing. Therefore, even when the F/B gain is large, the gear shift time can be shortened, and additionally the gear shift operation can be surely completed with preventing the actual motor rotational angle position from passing over the target motor rotational angle position.

Figure 6:
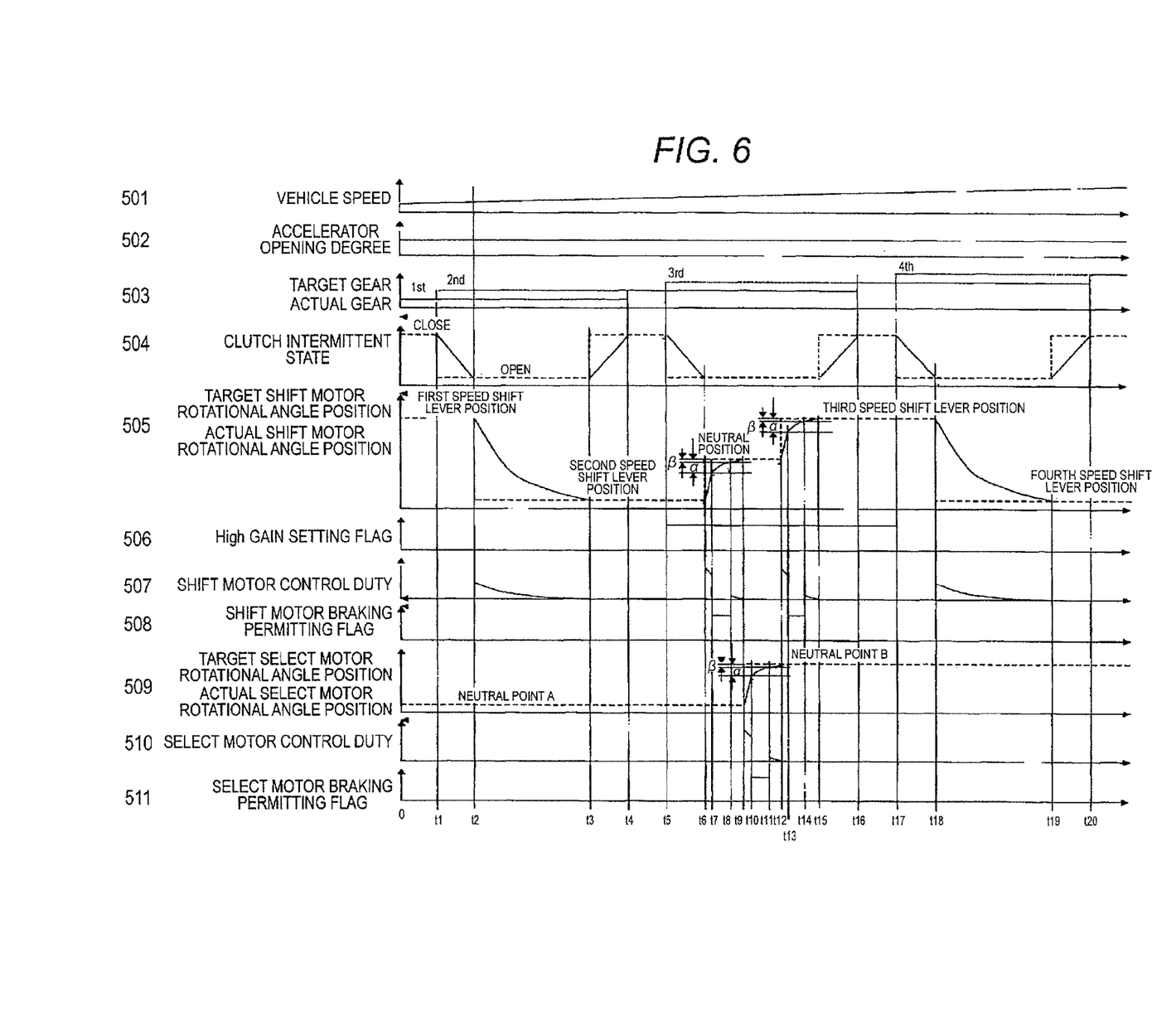
FIG. 6 is a diagram showing a gear shift behavior of a gear shift control device when a vehicle runs in the first embodiment of the present invention.

FIG. 6 is a time chart showing the gear shift behavior of the automatic transmission when the vehicle runs. In FIG. 6, 501 represents a vehicle speed, 502 represents an accelerator opening degree, and 503 represents a target gear stage (dashed line) and an actual gear stage (solid line), and this time chart represents an up-shift operation of first gear→second gear→third gear→fourth gear under an accelerated running state.

504 represents a clutch intermittent state. The clutch is released simultaneously with the change of the target gear stage, and the clutch start engagement simultaneously with the end of the gear shift. At the position of OPEN in the chart, the clutch is released, and the engine power (driving force) from the engine is not transmitted to the automatic transmission. At the position of CLOSE, the clutch is engaged, and the engine power from the engine is transmitted to the automatic transmission.

505 represents an actual shift motor rotational angle position (solid line) and a target shift motor rotational angle position (dash line) contained in the gear shift instruction from the automatic transmission controller. At a first gear shift lever position in the chart, the shift lever is set to the first gear. At a neutral position, the shift lever is released from the gear and set to a neutral state. At a second gear shift lever position, the shift lever is set to the second gear. At a third gear shift lever position, the shift lever is set to the third gear. At a fourth gear shift lever position, the shift lever is set to the fourth gear.

506 represents a High gain setting flag. When the flag is set to 1, the gear shift pattern in which the select motor is driven is set, and the F/B gain is set to the first F/B gain. When the flag is set to 0, the gear shift pattern in which the select motor is not driven is set, and the F/B gain is set to the second F/B gain. 507 represents shift motor control DUTY, and it is calculated by multiplying the difference between the target shift motor rotational angle position and the actual shift motor rotational angle position by the F/B gain. 508 represents a shift motor braking permitting flag. When the flag is set to 1, the shift motor is braked in the motor braking mode, and when the flag is set to 0, the shift motor is driven in accordance with the shift motor driving DUTY in the motor driving mode.

509 represents an actual select motor rotational angle position and a target select motor rotational angle position contained in the gear shift instruction from the automatic transmission controller. At the position of a neutral point A, the shift lever is set to the first gear or the second gear, and thus the shift lever is under a neutral state. At the position of a neutral point B, the shift lever is set to the third gear or the fourth gear, and thus the shift lever is under a neutral state.

510 represents a select motor control DUTY, and it is calculated by multiplying the difference between the target select motor rotational angle position and the actual select motor rotational angle position by the F/B gain.

511 represents a select motor braking permitting flag. When the flag is set to 1, the select motor is braked in the motor braking mode, and when the flag is set to 0, the select motor is driven in accordance with the select motor control DUTY in the motor driving motor.

Next, the operation of FIG. 6 will be described.

The time area between t0 and t1 corresponds to a section in which the vehicle runs at the first gear stage. At this time, the clutch is set to the engagement state (CLOSE), and the shift lever is set to the first gear. The time area between t1 and t4 represents a shift-up behavior from the first gear to the second gear. At the time t1, a second-gear shift-up is instructed from the automatic transmission controller, and the target shift gear is changed from the first gear to the second gear. This gear shift pattern is such a shift gear pattern that the select motor is not driven, and it is determined that the shift lever is moved in only the motor driving mode. Therefore, the motor braking permitting flag and the High gain setting flag are set to 0, and at the same time the clutch is released (OPEN).

At the time t2, the clutch is set to the open state, and the target shift motor rotational angle position (dashed line) is changed from the first gear shift lever position to the second gear shift lever position. In the time area between t2 and t3, the shift lever is moved from the first gear lever position to the second gear lever position in the motor driving mode in accordance with the product of the difference between the target shift motor rotational angle position and the actual shift motor rotational angle position and the F/B gain (second F/B gain set value).

At a time t3, the shift lever is converged to the second gear shift lever position, and the gear shift is completed. Therefore, at the same time, the engagement (CLOSE) of the clutch is started. At the time t4, the clutch is set to the engaged state, and at the same time the up-shift from the first gear to the second gear is finished. Therefore, the actual gear stage is changed from the first gear to the second gear. At this time, since the High gain setting flag is reset to 0, the F/B gain is set to a relatively small second F/B gain set value, and the shift motor control DUTY varies moderately in accordance with the product of the second F/B gain set value and the difference between the target shift motor rotational angle position and the actual shift motor rotational angle position. Therefore, the actual shift motor rotational angle position also varies moderately.

The time area between t5 and t16 represents a shift-up behavior from the second gear to the third gear. At the time t5, a third-gear shift-up is instructed from the automatic transmission controller, and the target gear stage is changed from the second gear to the third gear. This gear shift pattern corresponds to the gear shift pattern in which the select motor is driven, and it is determined that the shift lever should be moved in the mode driving mode and in the mode braking mode. Therefore, the mode braking permitting flag is reset to 0 and the High gain setting flag is set to 1, and at the same time the release (OPEN) of the clutch is started.

In the time between t6 and t9, the shift lever is first moved from the second gear to the neutral position by the shift motor. At the time t6, the clutch is set to the release (open) state, and the target shift motor rotational angle position is changed from the second gear shift lever position to the neutral position. In the time area between t6 and t7, the shift lever is moved from the second gear shift lever position to the neutral position in accordance with the product of the F/B gain and the difference between the target shift motor rotational angle position and the actual shift motor rotational angle position by the shift motor.

At this time, since the High gain setting flag is set to 1, the F/B gain is set to the first F/B gain set value larger than the second F/B gain set value, and the shift motor control DUTY drastically increases in accordance with the product of the first F/B gain set value and the difference between the target shift motor rotational angle position and the actual shift motor rotational angle position, so that the actual shift motor rotational angle position also varies drastically.

At the time t7, the difference between the target shift motor rotational angle position and the actual shift motor rotational angle position is smaller than the shift motor braking start difference $\alpha$, and thus the shift motor braking permitting flag is set to 1. At the time t8, the difference between the target shift motor rotational angle position and the actual shift motor rotational angle position is smaller than the shift motor braking end difference $\beta$, and thus the shift motor braking permitting flag is reset to 0.

At this time, in the time area between t7 and t8, the motor braking mode is set, and the power supply pattern of the motor driving circuit is set so that UH, VH and WH are set to OFF and UL, VL and WL are set to ON, whereby the motor is short-circuited and thus the shift motor is braked. Therefore, the rapid variation of the actual shift motor rotational angle position can be suppressed.

In the time area between t8 and t9, the difference between the target shift motor rotational angle position and the actual shift motor rotational angle position is smaller than the shift motor braking end difference $\beta$, and thus the motor driving mode is set again. Accordingly, the shift lever is converged to the neutral position in accordance with the product of the first F/B gain and the difference between the target shift motor rotational angle position and the actual shift motor rotational angle position by the shift motor.

Subsequently, in the time area between t9 and t12, the shift lever is moved from the neutral point A to the neutral point B by the select motor. At the time t9, the target select motor rotational angle position is changed from the neutral point A to the neutral point B. In the time area between t9 and t10, the shift lever is moved from the neutral point A to the neutral point B in accordance with the product of the F/B gain and the difference between the target select motor rotational angle position and the actual select motor rotational angle position in the motor driving mode by the select motor.

At this time, the High gain setting flag is set to 1. Therefore, the F/B gain is set to the first F/B gain set value larger than the second F/B gain set value, and the select motor control DUTY drastically increases in accordance with the product of the first F/B gain and the difference between the target select motor rotational angle position and the actual select motor rotational angle position, so that the actual select motor rotational angle position varies drastically.

At the time t10, the difference between the target select motor rotational angle position and the actual select motor rotational angle position is smaller than the motor braking start difference $\alpha$, and thus the select motor braking permitting flag is set to 1. AT the time t11, the difference between the target select motor rotational angle position and the actual select motor rotational angle position is smaller than the motor braking end difference $\beta$, and thus the select motor braking permitting flag is set to reset 0.

At this time, in the time area between t10 and t11, the motor braking mode is set, and the power supply pattern of the motor driving circuit is set so that UH, VH and WH are set to OFF and UL, VL and WL are set to ON, whereby the motor is short-circuited and thus the select motor is braked, so that the rapid variation of the actual select motor rotational angle position can be suppressed.

In the time area between t11 and t12, the difference between the target select motor rotational angle position and the actual select motor rotational angle position is smaller than the select motor braking end difference β. Therefore, the motor driving mode is set again, and the shift lever is converged to the neutral point B in accordance with the product of the first F/B gain and the difference between the target select motor rotational angle position and the actual select motor rotational angle position by the select motor.

In the time area between t12 and t15, the shift lever is moved from the neutral position to the third gear lever position by the shift motor.

At the time t12, the target shift motor rotational angle position is changed from the neutral position to the third gear shift lever position. The operation of converging the actual shift motor rotational angle to the target shift motor rotational angle in the time area between t12 and t15 is identical to the operation in the time area between t6 and t9 described above, and thus the description thereof is omitted. At the time t15, the shift lever is converged to the third gear shift lever position, and the gear shift is completed. Therefore, the engagement of the clutch is started, and the up-shift from the third gear to the fourth gear is finished at the same time when the engagement of the clutch is completed at the time t16, so that the actual gear stage is changed from the third gear to the fourth gear.

At the time t17, a fourth-gear shift-up is instructed from the automatic transmission controller, and the target gear stage is changed from the third gear to the fourth gear. This gear shift pattern is such a gear shift pattern that the select motor is not driven, and it is determined that the shift lever should be moved by only the motor driving mode. Therefore, the motor braking permitting flag and the F/B gain setting flag are reset to 0, and at the same time the release (OPEN) of the clutch is started.

At the time t18, the clutch is set to the release state, and the target shift rotational angle position is changed from the third gear shift lever position to the fourth gear shift lever position. In the time area between t18 and t19, the shift lever is moved from the third gear lever position to the fourth gear lever position in accordance with the product of the F/B gain (the second F/B gain set value) and the difference between the target shift motor rotational angle position and the actual shift motor rotational angle position in the motor driving mode.

At the time t19, the shift lever is converged to the fourth gear shift lever position, and the gear shift is completed. At the same time, the engagement (CLOSE) of the clutch is started, and at the time t20, the clutch is set to the engagement state. AT the same time, the up-shift from the third gear to the fourth gear is finished, and thus the actual gear stage is changed from the third gear to the fourth gear.

As described above, in the case of the gear shift pattern (between t5 and t16) in which the gear shift operation is executed by driving the shift motor and the select motor, when the difference between the target gear shift motor rotational angle position and the actual gear shift motor rotational angle position is out of a predetermined area, the motor driving mode is set, and the F/B control gain of the shift motor and the select motor (hereinafter referred to as gear shift motor) is increased, whereby the shift lever can quickly moved (between t6 and t7, between t9 and t10 and between t12 and t13).

On the other hand, when the difference between the target gear shift motor rotational angle position and the actual gear shift motor rotational angle position is within the predetermined area, the motor braking mode is set (between t7 and t8, between t10 and t11 and between t13 and t14), and the power supply pattern of the motor driving circuit is set so that UH, VH and WH are set to OFF and UL, VL and WL are set to ON, whereby the motor is short-circuited and the gear shift motor is braked at a proper timing. Accordingly, the actual gear shift motor rotational angle position can be converted to the target gear shift motor rotational angle position without passing over the target gear shift motor rotational angle position, and thus the gear shift time can be shortened.

At the same time, for example, at the shift-up stage, the gear shift pattern using the motor braking mode (at the shift-up stage from the second gear to the third gear) and the gear shift pattern which does not use the motor braking mode (at the shift-up stage from the first gear to the second gear and at the shift-up stage from the third gear to the fourth gear) are alternately repeated as shown in FIG. 6. Therefore, even when the motor driving element and the motor coil are heated by short-circuit current occurring at the motor braking time under the gear shift pattern using the motor braking mode, the heat is radiated under the gear shift pattern in which the motor braking mode is not used, and thus the thermal deterioration of the motor driving element and the motor coil can be suppressed.

On the other hand, in the case of the gear shift pattern in which the gear shift operation is executed by driving the shift motor and the select motor, when the F/B gain is increased for only the shift motor and the motor driving mode and the motor braking mode are switched to each other, the time for which the motor braking mode is used is shorter and the heat radiation time is longer as compared with the case where the F/B gain is increased for both the shift motor and the select motor and the motor driving mode and the motor braking mode are switched to each other. Therefore, the thermal deterioration of the motor driving element and the motor coil can be more greatly suppressed as compared with the case where the F/B gain is increased for both the shift motor and the select motor and the motor driving mode and the motor braking mode are switched to each other.

Furthermore, in the gear shift pattern in which the gear shift operation is executed by driving the shift motor and the select motor, when the F/B gain is increased for only the select motor and the motor driving mode and the motor braking mode are switched to each other, the time for which the motor braking mode is used is also shorter and the heat radiation time is also longer as compared with the case where the F/B gain is increased for both the shift motor and the select motor and the motor driving mode and the motor braking mode are switched to each other. Therefore, the thermal deterioration of the motor driving element and the motor coil can be also more greatly suppressed as compared with the case where the F/B gain is increased for both the shift motor and the select motor and the motor driving mode and the motor braking mode are switched to each other.

Second Embodiment

Figure 7:
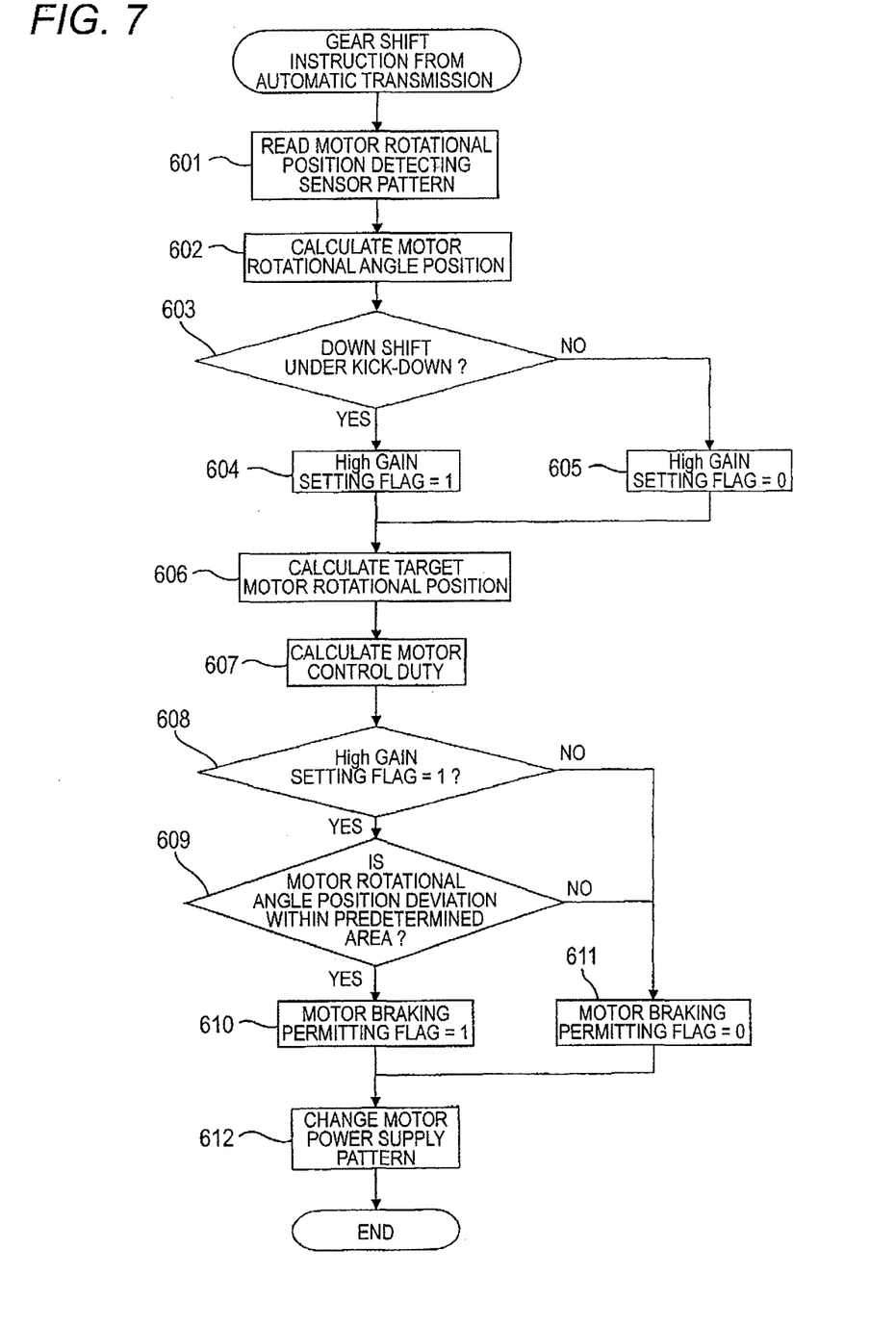
FIG. 7 is a flowchart showing a method of controlling the gear shift motor according to the second embodiment of the present invention.

Next, an gear shift operation of an automatic transmission according to a second embodiment of the present invention will be described with reference to FIGS. 7 to 8.

The gear shift operation of the automatic transmission according to the second embodiment of the present invention is different from the first embodiment only in that the High gain setting condition (step 403) of the gear shift motor control calculating method shown in FIG. 4, and thus only the different portions will be described with reference to the flowchart of FIG. 7.

In step 601, the pattern of the motor rotational position detecting sensor is read in. The step 602 is a step for calculating the motor rotational angle position. In this step, the actual motor rotational angle position is calculated on the basis of the pattern of the motor rotational position detecting sensor read in step 601, and then the processing goes to step 603. In step 603, it is determined whether the gear shift instruction from the automatic transmission controller indicates "downshift" at the kick-down time.

When it is determined that the gear shift instruction from the automatic transmission controller does not indicate "downshift" under the kick-down state, the processing goes to step 605 to set an F/B gain described later to a preset second F/B gain and set the High gain setting flag to 0. Furthermore, when it is determined that the gear shift instruction from the automatic transmission controller indicates "downshift" under the kick-down state, the processing goes to step 604 to set a position F/B gain described later to a first F/B gain larger than the second F/B gain and set the High gain setting flag to 1.

Figure 8:
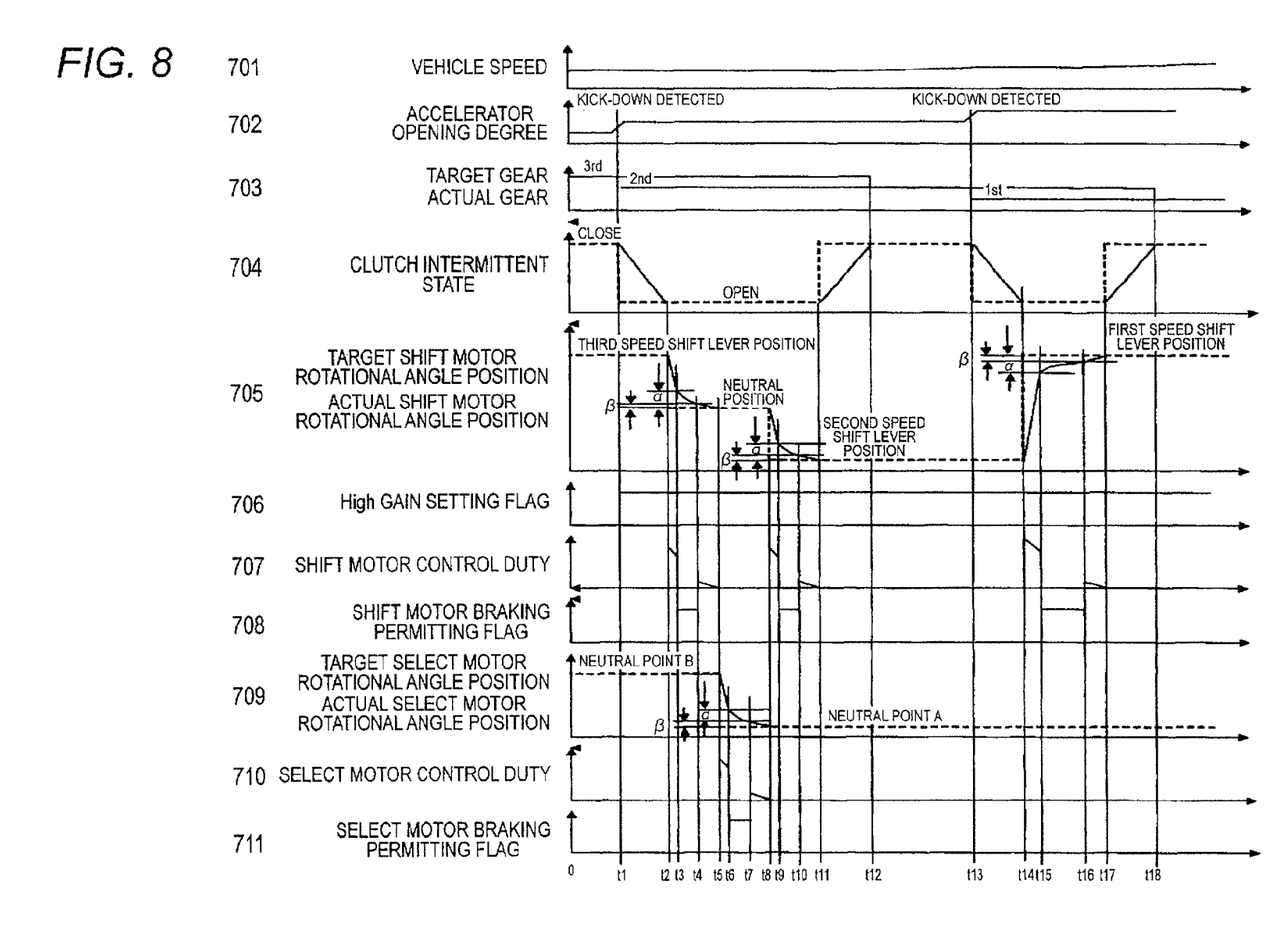
FIG. 8 is a diagram showing a gear shift behavior of a gear shift controller when a vehicle runs in the second embodiment of the present invention.

FIG. 8 is a time chart showing a gear shift behavior of an automatic transmission when a vehicle runs in the second embodiment of the present invention. In FIG. 8, steps from 701 to 711 represent the same content as the time chart shown in FIG. 6 in the first embodiment of the present invention, and this chart represents the gear shift operation of performing the downshift from the third gear to the second gear and the downshift from the second gear to the first gear by kick-down from a stationary running state.

The time area between t0 and t1 represents a section in which the vehicle runs at the third gear stage. At this time, the clutch is set to the engagement (CLOSE) state, and the shift lever is set to the third gear. The time area between t1 and t12 represents a downshift behavior from the third gear to the second gear. At the time t1, downshift to the second gear under the kick-down state is instructed from the automatic transmission controller, and the target gear stage is changed from the third gear to the second gear. At this time, the shift motor braking permitting flag is reset to 0, the High gain setting flag is set to 1, and at the same time the release (OPEN) of the clutch is started.

In the time area between t2 and t5, the shift lever is first moved from the third gear shift lever position to the neutral position by the shift motor. At the time t2, the clutch is set to the release state, and the target shift motor rotational angle position is changed from the third gear shift lever position to the neutral position. In the time area between t2 and t3, the shift lever is moved from the third gear shift lever position to the neutral position by the shift motor in accordance with the product of the F/B gain and the difference between the target shift motor rotational angle position and the actual shift motor rotational angle position in the motor driving mode.

At this time, since the High gain setting flag is set to 1, the F/B gain is set to a first F/B gain set value larger than the second F/B gain set value, and the shift motor control DUTY drastically increases in accordance with the product of the first F/B gain set value and the difference between the target shift motor rotational angle position and the actual shift motor rotational angle position, so that the actual shift motor rotational angle position varies drastically.

At the time t3, the difference between the target shift motor rotational angle position and the actual shift motor rotational angle position is smaller than the shift motor braking start difference α, and thus the shift motor braking permitting flag is set to 1. At the time t4, the difference between the target shift motor rotational angle position and the actual shift motor rotational angle position is smaller than the shift motor braking end difference β, and thus the shift motor braking permitting flag is reset to 0.

In the time area between t3 and t4, the motor braking mode is set, and the power supply pattern of the motor driving circuit is set so that UH, VH and WH are set to OFF and UL, VL and WL are set to ON, whereby the motor is short-circuited to brake the motor, so that the rapid variation of the actual shift motor rotational angle position can be suppressed.

In the time between time t4 and t5, the difference between the target shift motor rotational angle position and the actual shift motor rotational angle position is smaller than the shift motor braking end difference β. Therefore, the motor driving mode is set again, and the shift lever is converged to the neutral position in accordance with the product of the first F/B gain and the difference between the target shift motor rotational angle position and the actual shift motor rotational angle position by the shift motor.

Subsequently, in the time area between t5 and t8, the shift lever is moved from the neutral point B to the neutral point A by the select motor. At the time t5, the target select motor rotational angle position is changed from the neutral point B to the neutral point A. In the time area between t5 and t6, the shift lever is moved from the neutral point B to the neutral point A by the select motor in accordance with the product of the F/B gain and the difference between the target select motor rotational angle position and the actual select motor rotational angle position in the motor driving mode.

At this time, since the High gain setting flag is set to 1, the F/B gain is set to a first F/B gain set value larger than the second F/B gain set value, and the select motor control DUTY drastically increases in accordance with the product of the first F/B gain and the difference between the target select motor rotational angle position and the actual select motor rotational angle position, so that the actual select motor rotational angle position varies rapidly.

At the time t6, the difference between the target select motor rotational angle position and the actual select motor rotational angle position is smaller than the motor braking start difference α, and thus the select motor braking permitting flag is set to 1. At the time t7, the difference between the target select motor rotational angle position and the actual select motor rotational angle position is smaller than the motor braking end difference β, and thus the select motor braking permitting flag is reset to 0.

At this time, in the time area between time t6 and t7, the motor braking mode is set, and the power supply pattern of the motor driving circuit is set so that UH, VH and WH are set to OFF and UL, VL and WL are set to ON, whereby the motor is short-circuited and the select motor is braked, so that the rapid variation of the actual select motor rotational angle position is suppressed.

In the time area between t7 and t8, the difference between the target select motor rotational angle position and the actual select motor rotational angle position is smaller than the motor braking end difference β. Therefore, the motor driving mode is set again, and the shift lever is converged to the neutral point A by the select motor in accordance with the product of the first F/B gain and the difference between the target select motor rotational angle position and the actual select motor rotational angle position.

In the time area between t8 and t11, the shift lever is moved from the neutral position to the second gear shift lever position by the shift motor.

At the time t8, the target shift motor rotational angle position is changed from the neutral position to the second gear shift lever position. The operation of converging the actual shift motor rotational angle to the target shift motor rotational angle in the time area between t8 and t11 is identical to the operation in the time area between t2 and t5 described above, and thus the description thereof is omitted. At the time t11, since the shift lever is converged to the second gear shift lever position and the gear shift is completed, the engagement of the clutch is started, and the downshift from the third gear to the second gear is finished at the same time when the engagement of the clutch is completed at t12, so that the actual gear stage is changed from the third gear to the second gear.

The time area between t12 and t13 corresponds to a section in which the vehicle runs at the second gear stage. At this time, the clutch is set to the engagement (CLOSE) state, and the shift lever is set to the second gear. The time area between t13 and t18 represents a downshift behavior from the second gear to the first gear. At the time t13, shift-down to the first gear under kick-down is instructed from the automatic transmission controller, and the target gear shift stage is changed from the second gear to the first gear, the shift motor braking permitting flag is reset to 0, the High gain setting flag is set to 1, and at the same time the release (OPEN) of the clutch is started.

At the time t14, the clutch is set to the open state, and the target shift motor rotational angle position is changed from the second gear shift lever position to the first gear shift lever position.

In the time area between t14 and t17, the shift lever is moved from the second gear shift lever position to the first gear shift lever position by the shift motor.

In the time area between t14 and t15, the shift lever is moved from the second gear lever position to the first gear shift lever position in accordance with the product of the F/B gain and the difference between the target shift motor rotational angle position and the actual shift motor rotational angle position in the motor driving mode.

At this time, since the High gain setting flag is set to 1, the F/B gain is set to the first F/B gain set value larger than the second F/B gain set value, and the shift motor control DUTY drastically increases in accordance with the product of the first F/B gain and the difference between the target shift motor rotational angle position and the actual shift motor rotational angle position, and thus the actual shift motor rotational angle position also varies drastically.

At the time t15, the difference between the target shift motor rotational angle, position and the actual shift motor rotational angle position is smaller than the shift motor braking start difference α, and thus the shift motor braking permitting flag is set to 1. At the time t16, the difference between the target shift motor rotational angle position and the actual shift motor rotational angle position is smaller than the shift motor braking end difference β, and thus the shift motor braking permitting flag is reset to 0.

At this time, in the time area between t15 and t16, the motor braking mode is set, and the power supply pattern of the motor driving circuit is set so that UH, VH and WH are set to OFF and UL, VL and WL are set to ON, whereby the motor is short-circuited and shift motor is braked, so that the rapid variation of the actual shift motor rotational angle position is suppressed.

In the time area between t16 and t17, the difference between the target shift motor rotational angle position and the actual shift motor rotational angle is smaller than the shift motor braking end difference β. Therefore, the motor driving mode is set again, and the shift lever is converged to the first gear shift lever position by the shift motor in accordance with the product of the first F/B gain and the difference between the target shift motor rotational angle position and the actual shift motor rotational angle position.

At the time t17, the shift lever is converged to the first gear shift lever position, and the gear shift is completed. Therefore, the clutch start to engage, and simultaneously with the completion of the engagement of the clutch at the time t18, the downshift from the second gear to the first gear is finished, and thus the actual gear stage is changed from the second gear to the first gear.

As described above, in the case of such a gear shift pattern that downshift is executed by kick-down (between t1 and t12 and between t13 and t18), when the difference between the target gear shift motor rotational angle position and the actual gear shift motor rotational angle position is out of a predetermined area, the motor driving mode is set, and the F/B control gain of the shift motor and the select motor (hereinafter referred to as "gear shift motor") is increased, whereby the shift lever can be quickly moved (between t2 and t3, between t5 and t6, between t8 and t9 and between t14 and t15).

On the other hand, when the difference between the target gear shift motor rotational angle position and the actual gear shift motor rotational angle position is within the predetermined area, the motor braking mode (between t3 and t4, between t6 and t7, between t9 and t10 and between t15 and t16) is set, and the power supply pattern of the motor driving circuit is set so that UH, VH and WH are set to OFF and UL, VL and WL are set to ON to short-circuit the motor and brake the gear shift motor at a proper timing, whereby the actual gear shift motor rotational angle position is converged to the target gear shift motor rotational angle position without passing over the target gear shift motor rotational angle position. Therefore, the shift-down time under kick-down can be shortened, so that acceleration can be performed immediately after the kick-down.

In addition, the motor braking mode is used only under shift-down following kick-down, and thus even when the motor driving element and the motor coil are heated by the short-circuit current occurring under the motor braking operation, the motor braking mode is not used in the gear shift pattern in which the motor braking mode such as the normal shift-up/downshift or the like is not used. Therefore, even when the motor driving element and the motor coil is heated by the short-circuit current occurring under the motor braking operation at the downshift time using the motor braking mode, the heat is radiated at the normal up-shift/downshift time using no mode braking mode, so that the thermal deterioration of the motor driving element and the motor coil can be suppressed.

The first and second embodiments of the present invention are described above, however, the present invention is not limited to these embodiments. Various modifications may be made without departing from the subject matter of the present invention.

For example, the first and second embodiments adopt the following single clutch system. That is, when the gear shift is executed, the clutch is first released (opened), and the gear stage is changed. After the change of the gear stage is completed, the clutch is engaged (closed) to perform the gear shift operation. However, the transmission control method of the automatic transmission of the present invention may be applied to a process of changing the gear stage to a next gear stage a in advance in the following dual clutch system. According to the dual clutch system, a dedicated clutch is prepared for each of an odd-number gear stage group (first, third and fifth gears) and an even-number gear stage group (second, fourth and sixth gears). When a vehicle is running, the gear stage at the clutch side under release (open) is changed to a next gear stage in advance (at this time, the engine power of the engine is transmitted to the transmission by the engaged clutch). When the gear shift is executed, the currently engaged clutch is released, and the currently released clutch is engaged to perform the gear shift operation.

Various modifications and alterations of this invention will be apparent to those skilled in the art without departing from the scope and spirit of this invention, and it should be understood that this is not limited to the illustrate embodiments set forth herein.

What is claimed is:

1. A controller for an automatic transmission comprising:
   a clutch mechanism interposed between an engine and a gear shift mechanism to transmit driving power from the engine to the gear shift mechanism;
   a shift motor and a select motor for executing a gear shift operation of the gear shift mechanism;
   a gear shift control unit for controlling the shift motor and the select motor; and
   a transmission controller for instructing a gear shift pattern corresponding to a driving state to the gear shift control unit, characterized in that:
   the gear shift control unit has a target rotational angle position calculator for calculating a target rotational angle position of the shift motor and the select motor, an actual rotational angle position calculator for calculating an actual rotational angle position of the shift motor and the select motor, and an F/B gain setting unit for setting an F/B gain in accordance with a gear shift pattern, and when a gear shift instruction from the gear shift control unit is a gear shift pattern for driving at least the select motor, the F/B gain is set to be larger than a gear shift pattern which does not drive the select motor, and also a motor driving mode and a motor braking mode are switched to each other in accordance with the difference between the target rotational angle position and the actual rotational angle position.

2. The controller for the automatic transmission according to claim 1, wherein in a case where a gear shift pattern for driving the shift motor and the select motor is instructed, the F/B gain is set to a first F/B gain by the F/B gain setting unit, and a motor driving mode for subjecting the output of the motor to F/B control in accordance with the difference between the target motor rotational angle position and the actual motor rotational angle position and the first F/B gain to drive the shift motor and the select motor is set when the difference between the target motor rotational angle position and the actual motor rotational angle position is out of a predetermined area, and a motor braking mode for short-circuiting an armature winding of the motor to brake the shift motor and the select motor is set when the difference between the target motor rotational angle position and the actual motor rotational angle position is within the predetermined area; and in a case where a gear shift pattern for driving only the shift motor is instructed, the F/B gain is set to a second F/B gain smaller than the first F/B gain by the F/B gain setting unit, and a motor driving mode for subjecting the output of the motor to the F/B control in accordance with the difference between the target motor rotational angle position and the actual motor rotational angle position and the second F/B gain to drive the shift motor is set.

3. The controller for the automatic transmission according to claim 1, wherein in a case where a gear shift pattern for driving the shift motor and the select motor is instructed, with respect to the shift motor, the gear shift control unit sets the F/B gain to a first F/B gain by the F/B gain setting unit, and sets a motor driving mode for subjecting the output of the motor to F/B control in accordance with the difference between the target motor rotational angle position and the actual motor rotational angle position and the first F/B gain to drive the shift motor when the difference between the target motor rotational angle position and the actual motor rotational angle position is out of a predetermined area, and sets a motor braking mode for short-circuiting an armature winding of the motor to brake the shift motor when the difference between the target motor rotational angle position and the actual motor rotational angle position is within the predetermined area, and with respect to the select motor, the gear shift control unit sets the F/B gain to a second F/B gain smaller than the first F/B gain, and sets a motor driving mode for subjecting the output of the motor to the F/B control in accordance with the difference between the target motor rotational angle position and the actual motor rotational angle position and the second F/B gain to drive the select motor; and in a case where a gear shift instruction for driving only the shift motor is instructed, the gear shift control unit sets the F/B gain to a second F/B gain by the F/B gain setting unit, and sets a motor driving mode for subjecting the output of the motor to the F/B control in accordance with the difference between the target motor rotational angle position and the actual motor rotational angle position and the second F/B gain to drive the shift motor.

4. The controller for the automatic transmission according to claim 1, wherein in a case where a gear shift pattern for driving the shift motor and the select motor is instructed, with respect to the select motor, the gear shift control unit sets the F/B gain to a first F/B gain by the F/B gain setting unit, and sets a motor driving mode for subjecting the output of the motor to F/B control in accordance with the difference between the target mode rotational angle position and the actual motor rotational angle position and the first F/B gain to drive the select motor when the difference between the target motor rotational angle position and the actual motor rotational angle position is out of a predetermined area, and sets a motor braking mode for short-circuiting an armature winding of the motor to brake the select motor when the difference between the target motor rotational angle position and the actual motor rotational angle position is within the predetermined area, and with respect to the shift motor, the gear shift control unit sets the F/B gain to a second F/B gain smaller than the first F/B gain and sets a motor driving mode for subjecting the output of the motor to F/B control in accordance with the difference between the target motor rotational angle position and the actual motor rotational angle position and the second F/B gain to drive the shift motor; and in a case where a gear shift pattern for driving only the shift motor is instructed, the gear shift control unit sets the F/B gain to a second F/B gain by the F/B gain setting unit and sets a motor driving mode for subjecting the output of the motor to F/B control in accordance with the difference between the target motor rotational angle position and the actual motor rotational angle position and the second F/B gain to drive the shift motor.

5. A controller for an automatic transmission comprising:
   a clutch mechanism interposed between an engine and a gear shift mechanism to transmit driving power from the engine to the gear shift mechanism;
   a shift motor and a select motor for executing a gear shift operation of the gear shift mechanism;

a gear shift control unit for controlling the shift motor and the select motor; and a transmission controller for instructing a gear shift pattern corresponding to a driving state to the gear shift control unit, characterized in that:

the gear shift control unit has a target rotational angle position calculator for calculating a target rotational angle position of the shift motor and the select motor, an actual rotational angle position calculator for calculating an actual rotational angle position of the shift motor and the select motor, and an F/B gain setting unit for setting an F/B gain in accordance with a gear shift pattern, and wherein in a case where shift-down is instructed at a kick-down time, the gear shift control units sets the F/B gain to a first F/B gain by the F/B gain setting unit, and sets a motor driving mode of subjecting the output of the motor to F/B control in accordance with the difference between the target motor rotational angle position and the actual motor rotational angle position and the first F/B gain to drive the shift motor and the select motor when the difference between the target motor rotational angle position and the actual motor rotational angle position is out of a predetermined area, sets a motor braking mode of short-circuiting an armature winding of the motor to brake the shift motor and the select motor when the difference between the target motor rotational angle position and the actual motor rotational angle position is within the predetermined area; and in a case where a gear shift other than shift-down at the time of kick-down, the gear shift control unit sets the F/B gain to a second F/B gain by the F/B gain setting unit, and sets a motor driving mode for subjecting the output of the motor to F/B control in accordance with the difference between the target motor rotational angle position and the actual motor rotational angle position and the second F/B gain to drive the shift motor and the select motor is set.

6. The controller for the automatic transmission according to claim 2, wherein the difference out of the predetermined area is an area which is smaller than a motor braking start difference $\alpha$ and larger than a motor braking end difference $\beta$, and the difference within the predetermined area is an area which is larger than the motor braking start difference $\alpha$ or smaller than the motor braking end difference $\beta$.

7. The controller for the automatic transmission according to claim 3, wherein the difference out of the predetermined area is an area which is smaller than a motor braking start difference $\alpha$ and larger than a motor braking end difference $\beta$, and the difference within the predetermined area is an area which is larger than the motor braking start difference $\alpha$ or smaller than the motor braking end difference $\beta$.

8. The controller for the automatic transmission according to claim 4, wherein the difference out of the predetermined area is an area which is smaller than a motor braking start difference $\alpha$ and larger than a motor braking end difference $\beta$, and the difference within the predetermined area is an area which is larger than the motor braking start difference $\alpha$ or smaller than the motor braking end difference $\beta$.

9. The controller for the automatic transmission according to claim 5, wherein the difference out of the predetermined area is an area which is smaller than a motor braking start difference $\alpha$ and larger than a motor braking end difference $\beta$, and the difference within the predetermined area is an area which is larger than the motor braking start difference $\alpha$ or smaller than the motor braking end difference $\beta$.

* * * * *